US012160909B2

(12) United States Patent
Roach et al.

(10) Patent No.: US 12,160,909 B2
(45) Date of Patent: Dec. 3, 2024

(54) PRIVACY ENHANCED PERSONALIZATION ON PUBLIC CONNECTIONS

(71) Applicant: Google LLC, Mountain View, CA (US)

(72) Inventors: Emma Roach, Maple Valley, WA (US); Robertus Christianus Elisabeth Mariet, Gaanderen Gelderland (NL); Saurabh Srivastava, Bangalore (IN)

(73) Assignee: Google LLC, Mountain View, CA (US)

( * ) Notice: Subject to any disclaimer, the term of this patent is extended or adjusted under 35 U.S.C. 154(b) by 384 days.

(21) Appl. No.: 17/768,083

(22) PCT Filed: Apr. 30, 2020

(86) PCT No.: PCT/US2020/030626
§ 371 (c)(1),
(2) Date: Apr. 11, 2022

(87) PCT Pub. No.: WO2021/076187
PCT Pub. Date: Apr. 22, 2021

(65) Prior Publication Data
US 2023/0035515 A1 Feb. 2, 2023

(30) Foreign Application Priority Data
Oct. 15, 2019 (IN) .............................. 201921041793

(51) Int. Cl.
H04W 76/11 (2018.01)
H04L 67/306 (2022.01)

(52) U.S. Cl.
CPC ........... H04W 76/11 (2018.02); H04L 67/306 (2013.01)

(58) Field of Classification Search
CPC ..... H04W 76/11; H04W 12/50; H04W 12/63; H04L 67/306; H04L 63/104; H04L 67/04; H04L 67/52; H04L 12/4625
See application file for complete search history.

(56) References Cited

U.S. PATENT DOCUMENTS 10,037,550 B2 * 7/2018 Narasimha ......... G06Q 30/0269
2006/0059044 A1 3/2006 Chan et al.
(Continued)

FOREIGN PATENT DOCUMENTS

CN 102096701 6/2011
CN 108605199 9/2018
(Continued)

OTHER PUBLICATIONS

International Preliminary Report on Patentability in International Appln. No. PCT/US2020/030626, mailed on Apr. 28, 2022, 8 pages.
(Continued)

Primary Examiner — Hoang-Chuong Q Vu
(74) Attorney, Agent, or Firm — Fish & Richardson P.C.

(57) ABSTRACT

Systems and methods are disclosed for selecting a digital component for a user device based on data derived from connection parameters of the connection between the user device and an access point, without prompting the user for information. Connection parameters are extracted from access point data (e.g., geo-location parameters of the access point) that are specific to the access point and transformed into attributes of a user independently of requesting any submission of personal information from/about the user of the particular device. The attributes of the user are then used to generate a connection profile for the user. The connection profile can include the connection parameters as well as other derived attributes of the user. Based on the connection profile, a digital component is selected to be delivered to the user device.

20 Claims, 7 Drawing Sheets

(56) References Cited

U.S. PATENT DOCUMENTS

| | | | |
|---|---|---|---|
| 2010/0115048 A1* | 5/2010 | Scahill | H04L 67/62 |
| | | | 709/228 |
| 2011/0029670 A1* | 2/2011 | Klein | H04L 67/5681 |
| | | | 709/224 |
| 2011/0159818 A1 | 6/2011 | Scherzer et al. | |
| 2012/0047275 A1* | 2/2012 | Yang | H04W 48/18 |
| | | | 709/228 |
| 2012/0192258 A1* | 7/2012 | Spencer | H04W 4/029 |
| | | | 726/7 |
| 2012/0209839 A1 | 8/2012 | Andrews et al. | |
| 2012/0257536 A1* | 10/2012 | Kholaif | H04W 48/20 |
| | | | 370/254 |
| 2014/0092813 A1* | 4/2014 | Jaakkola | H04L 51/52 |
| | | | 370/328 |
| 2015/0094047 A1 | 4/2015 | Jung et al. | |
| 2015/0341965 A1 | 11/2015 | Spencer et al. | |
| 2016/0021503 A1 | 1/2016 | Tapia et al. | |
| 2017/0034692 A1 | 2/2017 | Spencer et al. | |
| 2020/0029376 A1* | 1/2020 | Asterjadhi | H04W 28/04 |
| 2020/0162986 A1* | 5/2020 | Pati | H04W 36/008375 |

FOREIGN PATENT DOCUMENTS

| | | |
|---|---|---|
| CN | 109891497 | 6/2019 |
| EP | 2716076 | 11/2018 |

OTHER PUBLICATIONS

International Search Report and Written Opinion in International Appln. No. PCT/US2020/030626, dated Aug. 7, 2020, 11 pages.

Notice of Allowance in Chinese Appln. No. 202080072616.3, mailed on May 15, 2024, 6 pages (with English translation).

Office Action in Chinese Appln. No. 202080072616.3, mailed on Oct. 30, 2023, 16 pages (with English translation).

* cited by examiner

| Profile Identifier | AP Identifier | Connection Date/Time | Attribute 1 |
|---|---|---|---|
| ABC1 | D75A | 05/29/2019 15:50 | Value |
| XYZ1 | D75B | 09/29/2019 10:50 | Value |

FIG. 5

PRIVACY ENHANCED PERSONALIZATION ON PUBLIC CONNECTIONS

CROSS-REFERENCE TO RELATED APPLICATIONS

This application is a National Stage Application under 35 U.S.C. § 371 and claims the benefit of International Application No. PCT/US2020/030626 filed Apr. 30, 2020, which claims priority to IN application No. 201921041793, filed Oct. 15, 2019, entitled PRIVACY ENHANCED PERSONALIZATION ON PUBLIC CONNECTIONS. The disclosures of the foregoing applications are incorporated herein by reference in their entirety.

BACKGROUND

Public "hotspots" offering free Internet access have become common in the developing world. In some cases, when users connect through these public connections, they are asked for personal information, which they are reluctant to provide. That personal information is sometimes used to enable better user experience and to provide personalized content for these users, for example, through a website that is rendered automatically on the user's device sometimes called a captive portal. Because some users do not provide any information or may even provide inaccurate information, the user experience is degraded as the content served through these hotspots is irrelevant and/or generic.

SUMMARY

One way to provide to provide a better user experience and personalized content is to use the context of the connection itself for purposes of selecting content that is presented to the user. That is, a system can use connection parameters (e.g., temporal and geo-location attributes) to infer information about the user of a connected device. An experience enhancement system can be used to provide a better experience for the user. When a user device (e.g., an electronic tablet, smart phone, computer, or another suitable device) connects to an access point (e.g., wired or wireless) providing Internet access, the experience enhancement system receives access point data that specifies that the user device has connected to the access point. The user device can connect to a public wireless hotspot, for example, at a train station, at an airport terminal, or another public place.

The experience enhancement system extracts, from the access point data, connection parameters (e.g., geo-location parameters of the access point) that are specific to the access point. For example, the experience enhancement system can extract a location of the access point, an identifier of the access point, a local time or time zone where the access point is located and/or other suitable parameters. For example, if the user device has connected to a wireless hotspot in an airport terminal (e.g., near a specific gate or gates), that information is extracted (e.g., via an identifier of the access point). When the connection parameters are extracted, the experience enhancement system transforms those parameters into attributes of a user. The experience enhancement system performs that transformation independently of requesting any submission of personal information from/ about the user of the particular device. In some implementations, the user can consent or withhold consent to use that data. To continue with the above example, if the experience enhancement system extracts data indicating that the user device has connected to a wireless hot spot at a specific gate of an airport terminal, the experience enhancement system determines, based on the time of day and the gate number, that a user is likely to fly to a particular destination (e.g., using information from an external source, such as a flight schedule for that specific gate). The attributes of the user are then used to generate a connection profile for the user. The connection profile can include the connection parameters as well as other attributes of the user. For example, if the user device is connected to an access point at an airport or a train station (e.g., at a particular gate or track, respectively), the experience enhancement system determines possible travel destination(s) and adds that information to the connection profile.

The experience enhancement system uses the connection profile to enhance user's experience and/or provide relevant content. Specifically, the experience enhancement system identifies, based on the connection profile generated for the user, a digital component to be presented at the particular user device during the connection of the particular user device to the particular access point. The experience enhancement system can compare the data in the connection profile with data related to digital components (e.g., advertisements) and select a digital component that matches the connection profile data.

In some implementations, the experience enhancement system uses and/or trains a neural network to select the appropriate digital component. Specifically, the experience enhancement system receives connection profile data, the corresponding digital component for each profile, and data indicating whether each user corresponding to each of the connection profiles interacted with a corresponding delivered digital component. The experience enhancement system inputs, into the neural network, the data for each connection profile and the data indicating whether each user corresponding to each connection profile interacted with a corresponding digital component. This data is used to train the neural network. When the neural network has been trained, the experience enhancement system inputs the connection profile into the neural network; and receives, as output of the neural network, an identifier of the digital component.

The experience enhancement system delivers the identified digital component to the user device during the connection of the particular user device to the particular access point. The identified digital component that is delivered to the particular user device during the connection to the particular access point differs from a digital component delivered to at least one of the multiple other different user devices that are also connected to the particular access point In some implementations, the experience enhancement system can receive data from an access point located in a travel terminal and transform the connection parameters into the attributes in a specific manner. Based on the data received from the access point (e.g., identifier of the access point, access point location, or other suitable data), the experience enhancement system determines that the access point is located at a travel terminal, and determine, using the time of day, one or more travel routes for the travel terminal. The experience enhancement system can, based on that information, identify a digital component based on one or more destinations of the one or more travel routes.

Using the connection profiles generated based on user attributes and connection parameters, the experience enhancement system is able to perform a variety of other actions. In some implementations, the experience enhancement system compares the connection profiles and assigns the profiles into groups based on commonality between the profiles. That is, the experience enhancement system can compare the connection profile for the user with connection profiles for other users that are assigned to a particular connection group. If the connection profile for the user matches the connection profiles for the other users, the enhancement experience system assigns the connection profile to the particular connection group. For example, the experience enhancement system can generate groups based on likely travel destination.

In some implementations, the experience enhancement system generates groups of connection profiles based on a threshold number of attributes matching between those connection profiles and targets those groups with particular digital components (e.g., advertisements, recommendations, or other suitable digital components). Specifically, the experience enhancement system compares each connection profile with other connection profiles and generates, based on the comparing, groups of connection profiles such that each group of connection profiles includes connection profiles with a threshold number of matching attributes. The experience enhancement system identifies, for each group of connection profiles a particular digital component and delivers a corresponding digital component to each group of connection profiles. For example, a first group of connection profiles can include matching attributes such as a destination (e.g., based on a location at a specific gate in an airport at a specific time). Thus, the experience enhancement system can select, for the first group, a digital component related to the destination attribute (e.g., an advertisement related to the destination). For example, if the destination is the city of New York, the experience enhancement system can select content describing a Broadway play as a digital component. In another example, a second group of connection profiles can include matching attributes for a current location (e.g., in a particular part of a train station). The experience enhancement system can select a digital component related to the current location (e.g., for a store in the current location). The experience enhancement system then delivers the corresponding digital component to the user devices corresponding to the users in the groups.

The experience enhancement system can detect that a user device reconnected to the same or a different access point, update the connection profile based on the new connection whether the connection is to a new access point or the original access point. Based on the updated profiles, the experience enhancement system selects a new experience or content for the user. Specifically, the experience enhancement system determines that the particular device has reconnected to the particular access point, and identifies updated attributes of the user (e.g., based on a new date or time or a new location relative to the access point. The experience enhancement system can make this determination based on the identifier of the access point.

Upon the determination that the device has reconnected to the same access point, the experience enhancement system updates the connection profile based on the updated attributes (e.g., with a new connection date and time, location of the device relative to the access point, and other suitable attributes). The experience enhancement system identifies a new digital component based on differences between the updated connection profile and the connection profile. For example, if the device has reconnected to the same access point (e.g., at an airport gate), but at a different time, the experience enhancement system determines (e.g., based on the date, time, and gate) a new destination for the user and updates the profile with that destination. Based on the update, the experience enhancement system can deliver a new digital component (e.g., advertisement, destination information, or another suitable digital component to the device). If the same device connects to a different access point, the experience enhancement system can analyze the changes, update the connection profile accordingly, and deliver a different digital component to the device.

The experience enhancement system provides various advantages. For example, the experience enhancement system enables targeting devices for delivery of relevant information without prompting or accessing information that many users are hesitant to provide. This system will also help retain users that disconnect from the system when prompted for information input. These users that would not be available for advertisement delivery can now be targeted and served advertisements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates a data structure for storing connection profiles.

Like reference numbers and designations in the various drawings indicate like elements.

DETAILED DESCRIPTION

Figure 1:
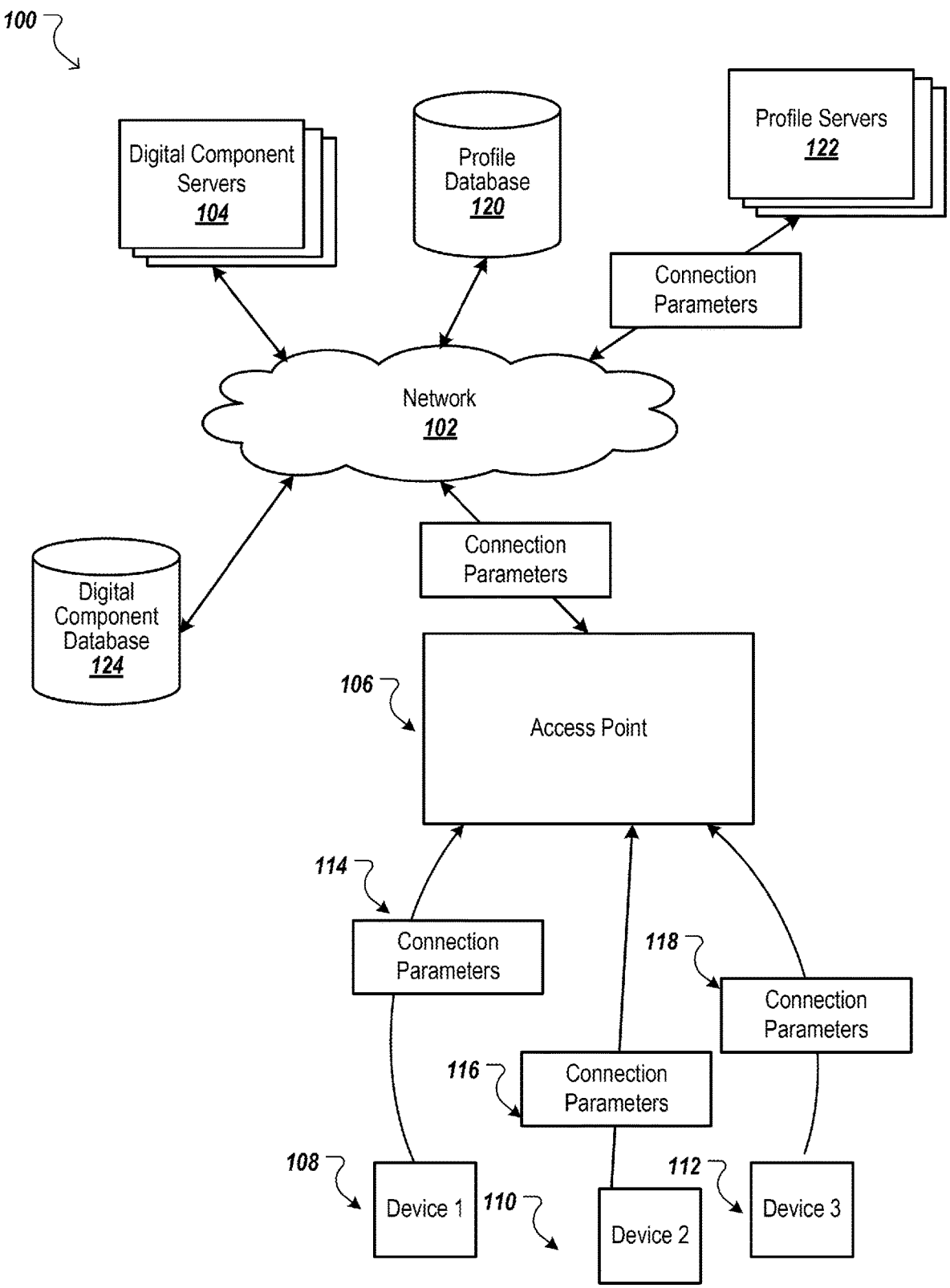
FIG. 1 is a block diagram of example components for the experience enhancement system.

This document discloses methods, systems, and devices that enhance a user's online experience in a privacy preserving way when that user is connected to a particular access point. FIG. 1 is a block diagram of example system 100 that includes components for the experience enhancement system. System 100 includes network 102 such as a local area network (LAN), a wide area network (WAN), the Internet, or a combination thereof. The network 102 connects various system components including digital component servers 104, profile database 120, profile servers 122, digital component database 124, and access point 106. The network 102 can facilitate connections for other devices (e.g., user devices 108, 110, and 112).

Digital component servers 104 provide digital components for delivery to user devices 108, 110, and 112. The digital component servers 104 can receive a request for a digital component, the request including data for identifying the digital component (e.g., a connection profile). The request can also include a network location (e.g., a Uniform Resource Locator (URL)) of the digital component servers and a return address (e.g., IP address for delivery of the digital component.

The digital components can be stored in digital component database 124. Each digital component can have associated digital component metadata sometimes referred to as distribution parameters. The experience enhancement system can compare the distribution parameters with the data in the connection profile to determine a match. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

Although, the digital component servers 104 and the digital component database 124 are shown as different components, those components can be hosted by one server. In some implementations, those components can be combined into one component that receives the connection profile, compares the connection profile with metadata for each of the digital components and selects a digital components that matches, or in some implementations, best matches the connection profile.

System 100 also includes profile servers 122. In some implementations, profile servers 122 can receive connection parameters from the access point 106 and generate connection profiles based on the connection parameters. The profile servers 122 also accept requests for connection profiles and transmit responses to those requests. Connection profiles can be stored in a profile database 120. The connection profiles can be stored in one or more database tables together with metadata for the connection profile. The metadata can include data such as creation time, update time, as well as other suitable data. Although the profile servers 122 and profile database 120 are shown as separate components, those components can be installed on one server or a set of servers.

System 100 also includes an access point 106. An access point is an electronic device that enables client devices to access a network. An access point can be a wireless access point that creates a wireless local area connection between a connecting device (e.g., a laptop computer, smart phone, an electronic table, or another suitable device) and a network (e.g., the Internet). Another example of an access point can be a wired access point that enables a wired connection to a network. Access point 106 enables user devices (e.g. user devices 108, 110, and 112) to connect to a network (e.g., the Internet). Access point 106 also receives access point data 114, 116, and 118 from the user devices 108, 110, and 112, respectively.

The experience enhancement system can be hardware, software, or a combination of hardware and software. In some implementations, the experience enhancement system can be configured on the profile servers 122. Although profile servers 122 are recited as including multiple servers, the profile servers 122 in certain instances can include one logical server that performs the actions of the experience enhancement system. Thus, the actions of FIGS. 2-4 can be executed on the one or more profile servers 122.

In some implementations, the experience enhancement system is configured on the access point 106. In these implementations, the profile servers 122 are used to receive the connection profiles from the access point 106 and store those profiles in profile database 120. Thus, the actions of FIGS. 2-4 can be executed on the access point 106. The access point 106 can communicate with the profile servers 122 to transmit and receive the connection profiles, connection parameters and other profile data when executing various actions. In addition, the access point 106 can communicate with digital component servers 104 and/or digital component database 124 to request and receive digital components. Although both digital component servers 104 and profile servers 122 are shown as multiple servers, each of these component can be a single logical or physical server.

In some implementations, the experience enhancement system can be configured on its own server (not shown). That server can communicate with access point 106 to receive connection parameters and transmit generated connection profiles to profile serves 122 and/or profile database server 120. In addition, the experience enhancement server can communicate with digital component servers to request and receive digital components. The experience enhancement server also communicates with the access point 106 to deliver identified digital component s to user devices (e.g., user device 108, 110, and 112).

Figure 2:
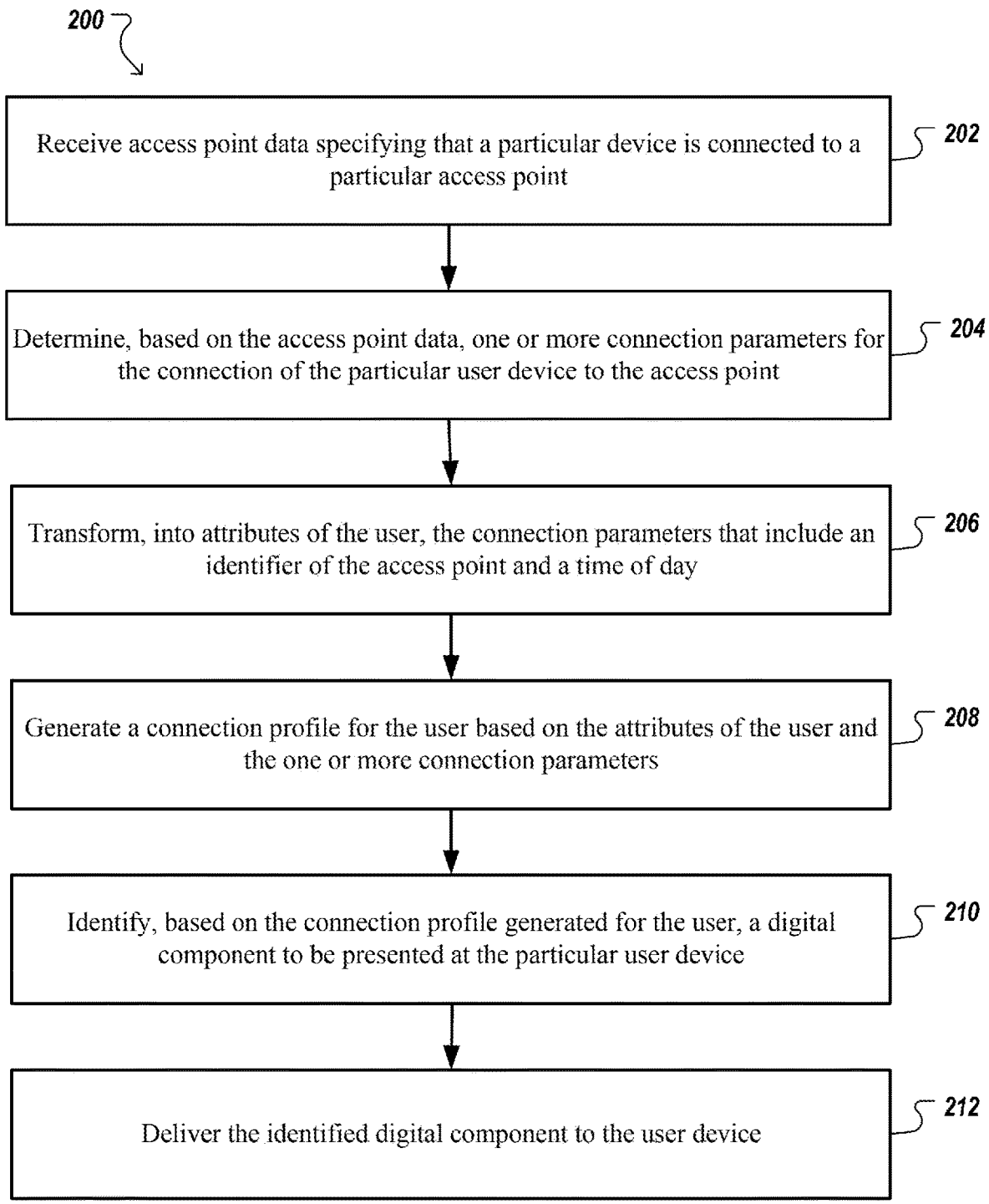
FIG. 2 is a box diagram of example actions for delivering a digital component to a user device.

FIG. 2 is a box diagram an example process 200 that the experience enhancement system performs to deliver a digital component to a user device. At 202, the experience enhancement system receives access point data specifying that a particular device is connected to a particular access point, the particular access point providing Internet access to multiple other different user devices. In the implementations where the experience enhancement system resides on one or more profile servers 122, the profile servers 122 receive access point data from access point 106. Access point 106 receives some access point data from a user device (e.g., user device 108, 110, and/or 112). Thus, the access point data can include access point data 114, 116, and/or 118.

In the implementations where the experience enhancement system is configured on access point 106, the experience enhancement system receives access point data at access point 106. The access point data can include access point data from the user device (e.g., a user device 108, 110, or 112) and access point data retrieved from the access point 106. The access point data can include a location of the access point (e.g., latitude and longitude), a type of location (e.g., a travel hub such as airport, train station, and another suitable location), a name of the location (e.g., John F. Kennedy International Airport), a location of the user device relative to the access point, and other suitable data. The access point data can also include user device information such as operating system, device make and model, mobile network range, browser name and version, time of day, date, and other suitable data.

In the implementations where the experience enhancement system is configured on its own server, the experience enhancement system receives the access point data at that server from, for example, the access point 106 itself. The access point 106 can combine the access point data received from one or more user devices with access point data associated with the access point itself and transmit that data to the server hosting the experience enhancement system.

At 204, the experience enhancement system determines, based on the access point data, one or more connection parameters for the connection of the particular user device to the access point. In some implementations, the connection parameters include geo-location parameters for the access point. The experience enhancement system can parse the received data to determine the connection parameters. For example, the access point data can be a structured file (e.g., an XML file) that the experience enhancement system can parse according to a parsing algorithm that identifies various tags in the structured data for specific data pieces. Thus, the connection parameters can include one or more pieces of the access point data described above.

At 206, the experience enhancement system transforms, into attributes of the user, the connection parameters that include an identifier of the access point and a time of day. For example, the experience enhancement system can transform the location of a wireless access point to a location of the user device. If there is only one access point in the vicinity, the experience enhancement system can use an angle of arrival technique to identify an exact location of the user device. This technique works with multi-user, multiple input, multiple output ("MIMO") wireless access points, which include two or more antennas. If multiple access points, are within range of the user device, the experience enhancement system can use triangulation techniques based on the distance (e.g., by measuring signal strength) from each of the routers in the vicinity. In another example, the experience enhancement system can determine a type of a location (e.g., from the access point data). For example, the location can be a travel hub such as a train station, a bus station, an airport, or another suitable travel hub.

In one example, the experience enhancement system can use a location of the access point (e.g., based on the type of location) to derive attributes of the user. Thus, if the type of location is a travel terminal, the experience enhancement system can transmit a request to a travel database for possible destinations. The request can include a terminal name (e.g., name of the airport a number of the terminal) and a sub-terminal name (e.g., a gate number). Based on that information, the experience enhancement system can receive one or more destinations and store a new user attribute "destination". In another example, the experience enhancement system can query a weather database for the location of the access point and the current time to determine a "weather" user attribute. The weather user attribute can be used to identify a digital component related to specific weather (e.g., an advertisement for an umbrella if the weather indicates rain or an advertisement for sunglasses if the weather indicates a sunny day.)

In some implementations, the experience enhancement system can derive user attributes based on the location of the access point. For example, the experience enhancement system can determine the user's language based on the location so that digital components present to the user are in the proper language. In another example, based on the time of day and the connection length, the experience enhancement system can add a "nourishment" attribute indicating that the user may want to eat or drink something. For example, if the user device has been connected for a number of hours, the "nourishment" user attribute can have a positive value so that a digital component can be identified that recommends or advertises, for example, a nearby restaurant.

The experience enhancement system can transform the connection parameters into the attributes of the user using particular actions when the access point is located in a travel terminal. The experience enhancement system determines based on the identifier of the access point that the access point is located at a travel terminal. The experience enhancement system can make the determination using various methods. For example, the experience enhancement system can retrieve data associated with the access point. The data can include a type of a location. If the type of the location matches a travel terminal type, the experience enhancement system determines that the access point is located at a travel terminal. In another example, the experience enhancement system can retrieve global positioning coordinates of the access point and determine based on those coordinates whether a travel terminal exists at those coordinates.

Upon determining that the access point is located at a travel terminal, the experience enhancement system determines, using the time of day, one or more travel routes for the travel terminal. For example, the experience enhancement system can access one or more databases for travel information (e.g., bus schedule, train schedule, flight schedule, and other suitable travel information). The experience enhancement system can retrieve a type associated with the travel terminal. The types can include train terminal, bus terminal, airport, and other suitable types. In addition, each of the terminals can include a number of sub-terminals corresponding to, for example, a track number for a train terminal, a gate number for an airport terminal, or another suitable sub-terminal. The experience enhancement system can retrieve, for example, based on the metadata of the access point a sub-terminal associated with the access point. Thus, a record for the access point can include a terminal name value and a sub-terminal name value.

The experience enhancement system can transmit the time of day, the terminal value and the sub-terminal value to a database to identify one or more routes for the combination of these values. For example, the experience enhancement system can receive (e.g., based on the access point being located near a specific gate in an airport terminal) from the database one or more flights that will be departing from the gate within a threshold amount of time (e.g., within two hours). Based on that information, the experience enhancement system can generate a destination user attribute and, in some implementations, a type of destination (e.g., flight). Generally, the destination can be of a bus route in a bus terminal, a train route at a specific track of the train station, or another suitable destination.

In a specific example, if the experience enhancement system determines that the user device is connected through an access point at a train station in New York City next to a particular track with the next train heading to Washington DC, the experience enhancement system stores the term "Washington DC" as a "destination" user attribute.

Referring back to FIG. 2, at 208, the experience enhancement system generates a connection profile for the user based on the attributes of the user and the one or more connection parameters. For example, the experience enhancement system can generate a data structure to hold the connection profile. The connection profile can include a location of the access point (e.g., latitude and longitude), a type of location (e.g., a travel hub such as airport, train station, and another suitable location) a name of the location (e.g., John F. Kennedy International Airport), a location of the user device relative to the access point. In addition, the connection profile can include weather information for the user device (e.g., local weather). When the connection profile is associated with a travel terminal, the connection profile can include weather information for the destination. In some implementations, the connection profile can include device information, for example, version of the operating system, device make and model, mobile network range, browser name and version and other suitable device information. The experience enhancement system can store the profile data in a database (e.g., profile database 120).

At 210, the experience enhancement system identifies, based on the connection profile generated for the user, a digital component to be presented at the particular user device. The digital component may be presented to the particular user device during the connection of the particular user device to the particular access point. As discussed above, the experience enhancement system can transmit a request for a digital component to the digital component servers 104. The request can include one or more attributes of the user. In some implementations, the request includes the full connection profile or a partial connection profile. In some implementations, the connection profile includes, or is based on, a connection speed of the user device to the access point 106. Based on the connection speed, the experience enhancement system can provide different types of content (e.g., text content at slower connection speeds, and image and/or multimedia content at faster connection speeds). The experience enhancement system can transmit the request from a server of profile servers 122. The experience enhancement system can retrieve the connection profile or a part of the connection profile from profile database 120. In some implementations (e.g., where there are no profile servers 122 and/or profile database 120), the experience enhancement system can transmit the request from the access point 106. For example, access point 106 can store the connection profiles in its memory and/or in a profile database 120. The access point 106 can retrieve the full connection profile or a portion of the connection profile from profile database 120 or from its own storage and transmit the request to the digital component servers 104.

In one example, the experience enhancement system can store the connection profile in the profile database. The experience enhancement system can also initiate a search for a digital component. For example, a component of the experience enhancement system can reside on a server of the profile servers 122. That component can initiate a request to the digital component servers 104 for a digital component. The request can include the term "Washington DC." A digital component server of the digital component servers 104 can receive the request and initiate a search for the term within metadata associated with the digital components. The search can be a database search in the digital component database. In some implementations, the search includes a search of a database index (e.g., stored at the digital component servers 104 and at the digital component database 124). When the search returns one or more matching digital components. The one or more digital components are sent to the profile servers 122 and then to a user device (e.g., device 108, 110, and/or 112) through the access point 106.

At 212, the experience enhancement system delivers the identified digital component to the user device. The identified digital component is delivered during the connection of the particular user device to the particular access point. In some implementations, the delivered digital component differs from a digital component delivered to at least one of the multiple other different user devices that are also connected to the particular access point. The experience enhancement system can deliver the digital component to the user device (e.g., user device 108, 110, and/or 112). In some implementations, the experience enhancement system receives the digital component (or in some instances multiple digital components) at profile servers 122 and transmits the digital component through the access point 106 to a user device or multiple user devices (e.g., user device 108, 110, and/or 112). In some implementations (e.g., where there are no existing profile servers 122), the experience enhancement system receives the digital component at access point 106 and transmits that component to the user device 108, 110, and/or 122.

In some implementations, the experience enhancement system assigns a particular connection profile to a group of similar connection profiles (e.g., a group that includes connection profiles with similar user attributes). Specifically, the experience enhancement system compares the connection profile for the user with connection profiles for other users. Those connection profiles can be assigned to a connection group. If the connection profile matches one or more profiles in the connection group, the experience enhancement system assigns the connection profile to a particular connection group.

Figure 3:
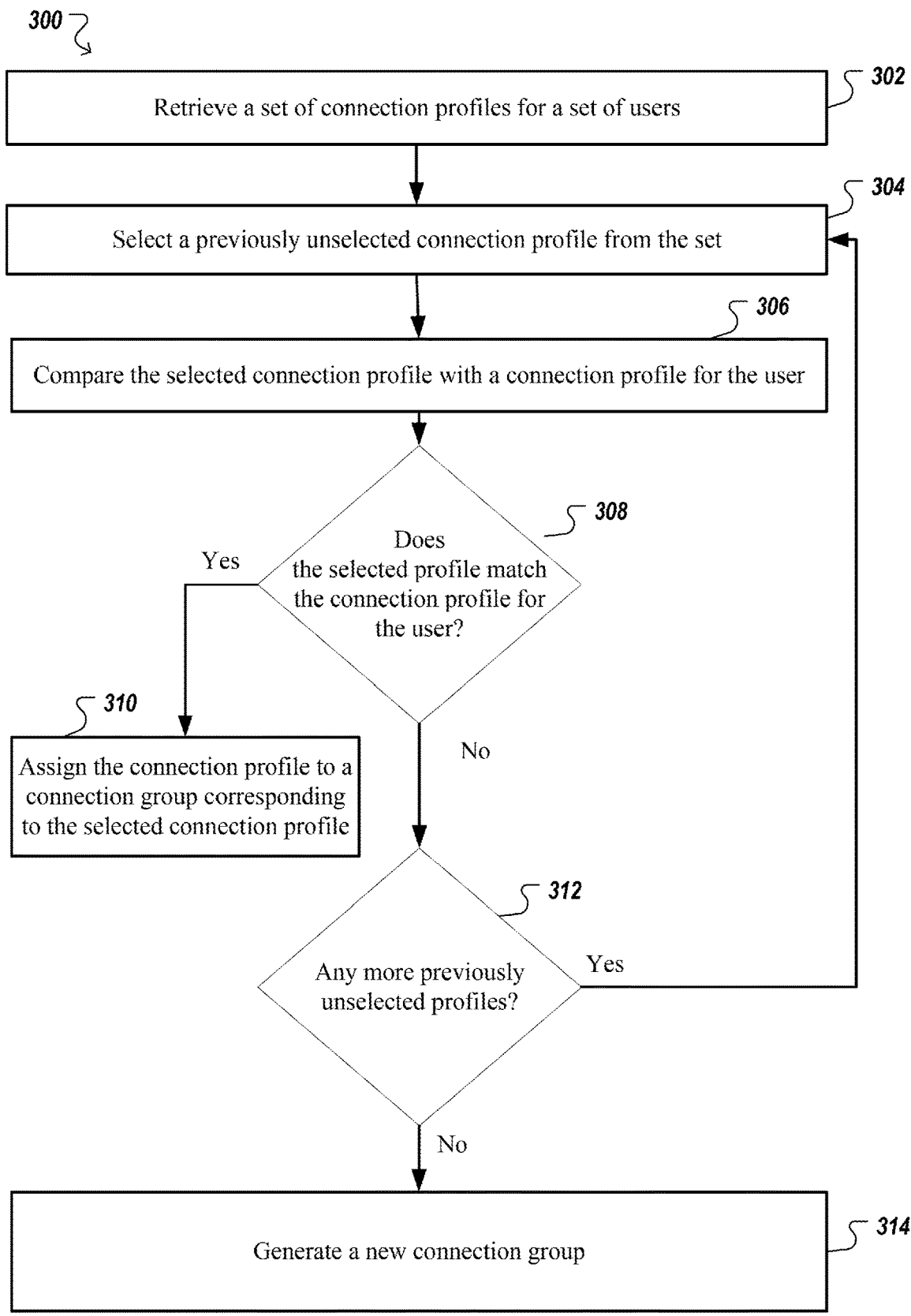
FIG. 3 is a block diagram of example actions for assigning a connection profile to a group.

FIG. 3 is a block diagram of process 300 for assigning a connection profile to a group. In some implementations, the experience enhancement system performs the actions of process 300 on a server of profile servers 122. The experience enhancement system can perform process 300 on access point 106 or another suitable device. At 302, the experience enhancement system retrieves a set of connection profiles for a set of users. For example, the experience enhancement system can retrieve the connection profiles from profile database 120 by generating a profile request. The experience enhancement system can transmit the profile request from a server of profile servers 122. In some implementations, the experience enhancement system transmits the profile request from the access point 106. In response to the request, the experience enhancement system receives the set of connection profiles. If the connection profiles reside locally, the experience enhancement system can retrieve the connection profiles from local storage.

Upon retrieval, the experience enhancement system can iterate through the set of connection profiles to find a match. Thus, at 304, the experience enhancement system can select a previously unselected a connection profile from the set. When the connection profiles are received, the experience enhancement system can generate a data structure and place the connection profile in the data structure. The generated data structure can allow iterating through the items in the data structure.

At 306, the experience enhancement system compares the selected connection profile with a connection profile for the user. For example, each connection profile can include a number of user attributes. The experience enhancement system can compare the corresponding attributes. FIG. 5 illustrates a data structure 500) that stores connection profiles 502 and 504. The connection profiles can include a profile identifier 512 that is a unique value identifying each profile (e.g., an alphanumeric string). Each connection profile can also include an access point identifier 506. The access point identifier 506 identifies the access point to which the user device is connected. In addition, each connection profile can include a connection date/time 508 and other attributes (e.g., attribute 510). The other attributes can be user attributes that, for example, have been derived from the connection parameters. The experience enhancement system can compare the corresponding attributes as illustrated in FIG. 5.

At 308, the experience enhancement system determines whether the selected profile matches the connection profile of the user. In some implementations, if one or more user attributes or connection parameters in the two profiles match, the experience enhancement system determines that the two profiles match. In some implementations, if a particular percentage of the attributes within the profiles match, a match is found. If the profiles match, process 300 moves to 310 where the experience enhancement system assigns the connection profile to a connection group corresponding to the selected connection profile. For example, the experience enhancement system can store a group identifier with the connection profile to indicate the associated group. If the experience enhancement system determines that the selected profile does not match the connection profile of the user process 300 moves to 312.

At 312, the experience enhancement system determines whether there are any more previously unselected profiles in the set of connection profiles. If there are more previously unselected profiles, process 300 moves to 304, where another profile is selected for comparison. Thus, the experience enhancement system iterates through the set of connection profiles. Although not shown in FIG. 3, the experience enhancement system can retrieve another set of profiles (e.g., a profile associated with a different group) and iterate through those to determine whether the connection profile of the user matches a different group. At 314, the experience enhancement system generates a new connection group if no profile of any group matches the connection profile of the user. For example, the experience enhancement system can generate a new group identifier for a new group and store that identifier with the connection profile of the user.

Figure 4:
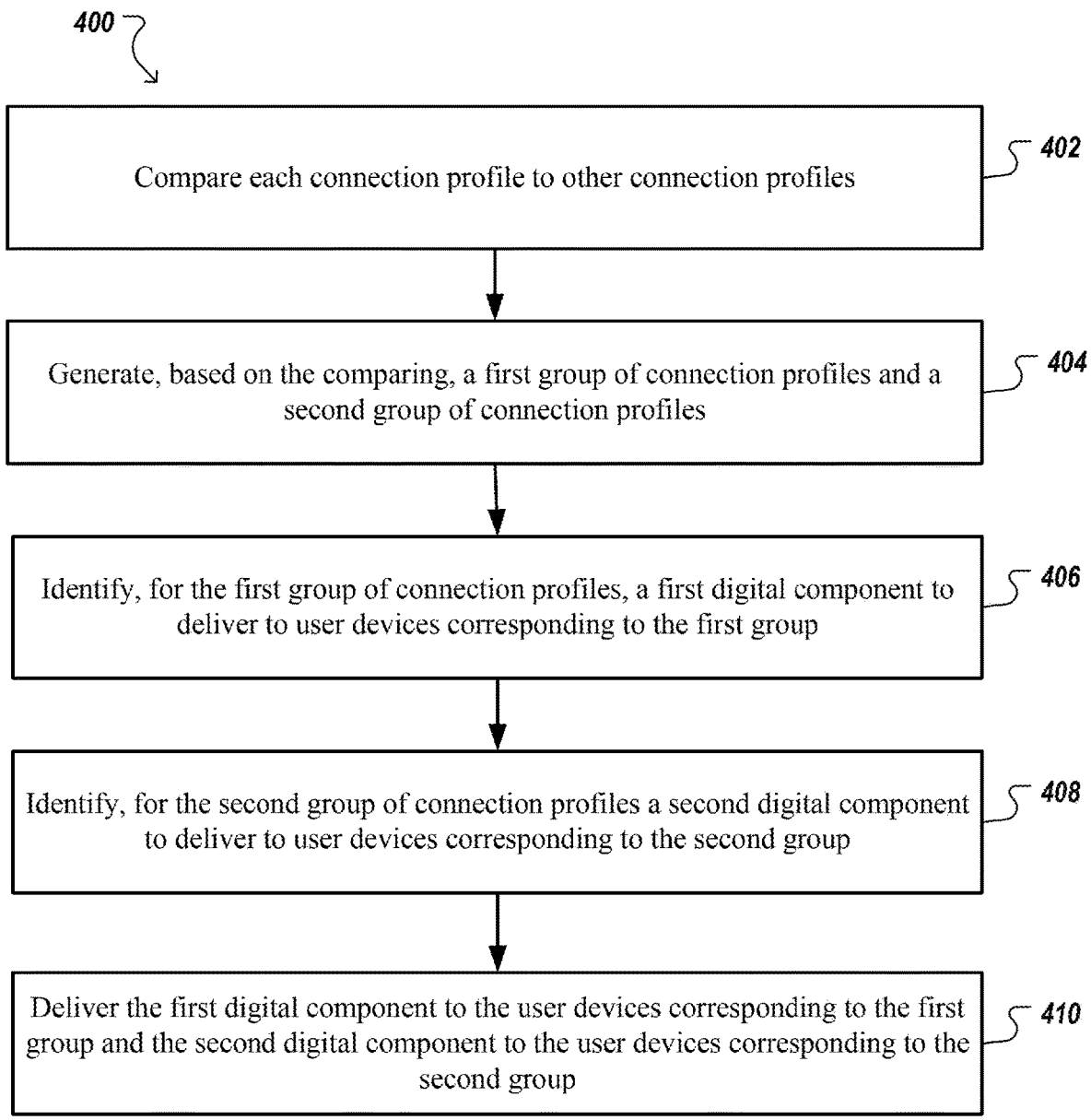
FIG. 4 illustrates assigning connection profiles to groups.

In some implementations, the experience enhancement system assigns connection profiles to groups to deliver the same digital component to every user device in a group. Process 400 of FIG. 4 illustrates a process for assigning connection profiles to groups to deliver the same digital component to user devices in the group. At 402, the experience enhancement system compares each connection profile to other connection profiles. For example, the experience enhancement system can iterate through each stored connection profile and compare each profile to each other profile to identify attributes within those profiles that match. If a threshold number of attributes match, the experience enhancement system determines that two profiles should be assigned to the same group.

At 404, the experience enhancement system generates, based on the comparing, a first group of connection profiles and a second group of connection profiles. Each of the first group of connection profiles and the second group of connection profiles includes connection profiles with a threshold number of matching attributes. In some implementations, more than two groups of connection profiles can be generated based on the matching. For each profile, the experience enhancement system can store group information with the connection profile itself. In some implementations, the group information can be stored separately from the connection profiles (e.g., in a table with identifiers of the matching profiles).

At 404, the experience enhancement system identifies, for the first group of connection profiles, a first digital component to deliver to user devices corresponding to the first group and at 406, the experience enhancement system identifies, for the second group of connection profiles a second digital component to deliver to user devices corresponding to the second group. For example, the experience enhancement system can identify a representative profile for each group. The experience enhancement system can retrieve all attributes within the profiles of each group that are the same for all or some of the connection profiles in the corresponding group and generate a group profile for each group. The experience enhancement system can transmit each group profile in a corresponding request for a digital component. For example, the experience enhancement system can transmit each request that includes a group profile from one of the profile servers 122 to a server of the digital component servers 104. In some implementations, the experience enhancement system can transmit the request from access point 106. The experience enhancement system can receive one or more digital component in response to the request.

The digital component servers 104 receive the request and compare the received connection profile or portion of the connection profile in the request with metadata for each digital component (e.g., the digital components stored in digital component database 124). If the connection parameters match the metadata of a particular digital component, that digital component is retrieved from the digital component database 124 and transmitted to a requesting user device through the profile servers 122 and the access point 106.

At 410, the experience enhancement system delivers the first digital component to the user devices corresponding to the first group and the second digital component to the user devices corresponding to the second group. For example, the experience enhancement system can deliver the digital components from a server of the profile servers 122 by including with the digital component a corresponding device identifier (e.g., internet protocol address for the device) as a target for the digital component. The experience enhancement system can transmit the digital components through access point 106. In some implementations (e.g., when no profile servers 122 exist), the experience enhancement system receives the digital components at access point 106 and transmits those digital components, according to the group assignments, to user devices 108, 110, and/or 112.

Figure 6:
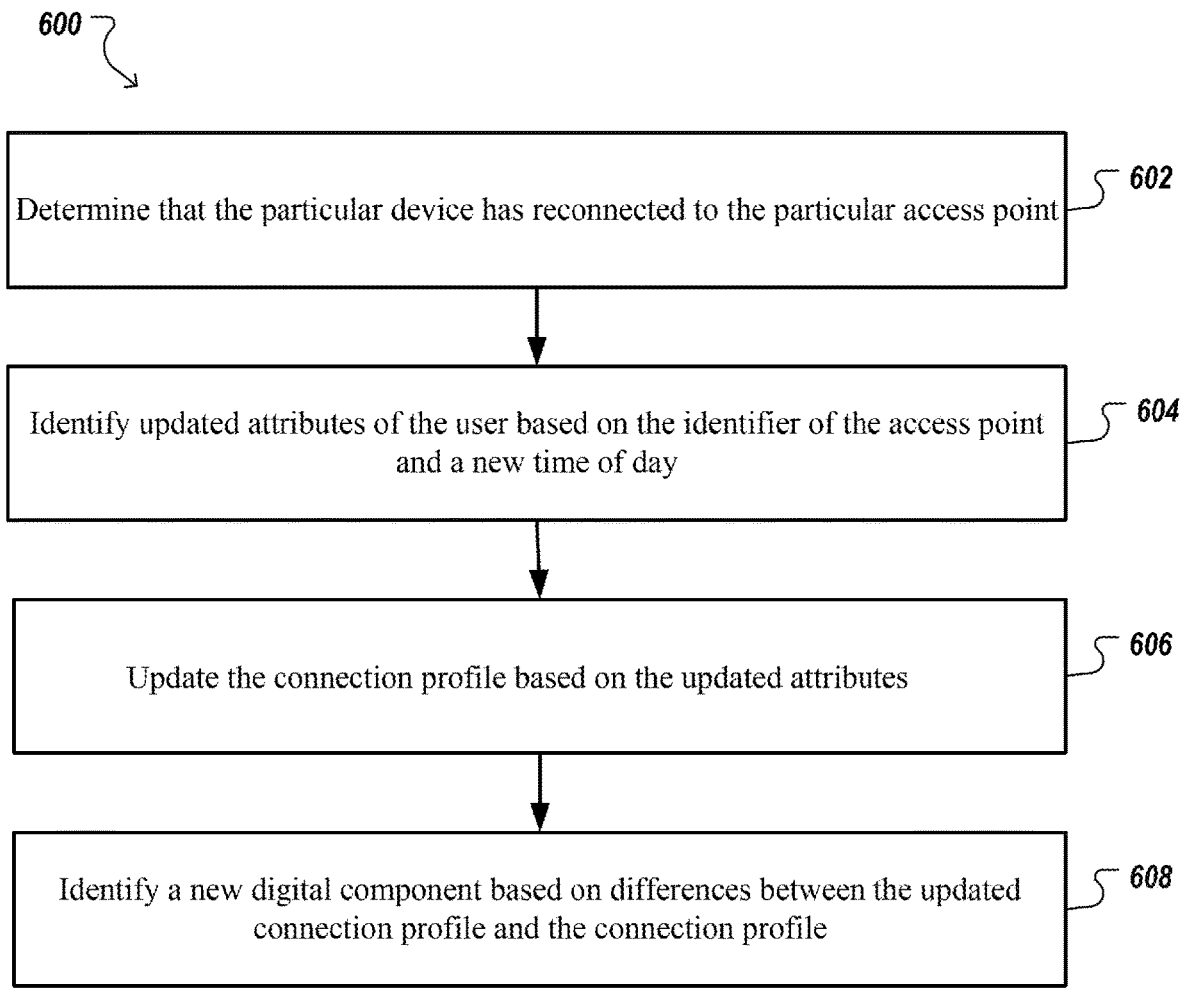
FIG. 6 illustrates detecting that a user device reconnected to an access point and identifying a new digital component for that user device.

In some implementations, the experience enhancement system detects when a particular device has reconnected to a particular access point and updates the connection profile (e.g., instead of creating a new connection profile) based on the reconnection while also identifying a new digital component for the user device. FIG. 6 illustrates process 600 for detecting that a user device reconnected to an access point and identifying a new digital component for that user device.

At 602, the experience enhancement system determines that the particular device has reconnected to the particular access point. The experience enhancement system can make the determination by comparing a device identifier of the connecting device with device identifiers stored in other connection profiles. For example, connection profile 502 of FIG. 5 can have an attribute that stores a device identifier of the connected device. In addition, the experience enhancement system can compare an access point identifier of each connection profile (e.g., AP identifier 506 of FIG. 5) with the access point identifier of the access point (e.g., access point 106) to which the user device is connected. If both the access point identifier and the device identifier match a specific connection profile, the experience enhancement system determines that a particular device has reconnected to the particular access point.

At 604, the experience enhancement system identifies updated attributes of the user based on the identifier of the access point and a new time of day. For example, if the access point is located at a specific gate in an airport terminal, the experience enhancement system can request flight information based on the terminal, gate, and time of day. In response, the experience enhancement system receives one or more possible destination for the connection profile At 606, the experience enhancement system updates the connection profile based on the updated attributes. To continue with the example above, the experience enhancement system can store one or more new destinations in the connection profile. At 606, the experience enhancement system identifies a new digital component based on differences between the updated connection profile and the connection profile. For example, the experience enhancement system can identify a digital component related to the new destination (e.g., if the new destination is San Francisco, the identified digital component can be an advertisement of a business in San Francisco).

Figure 7:
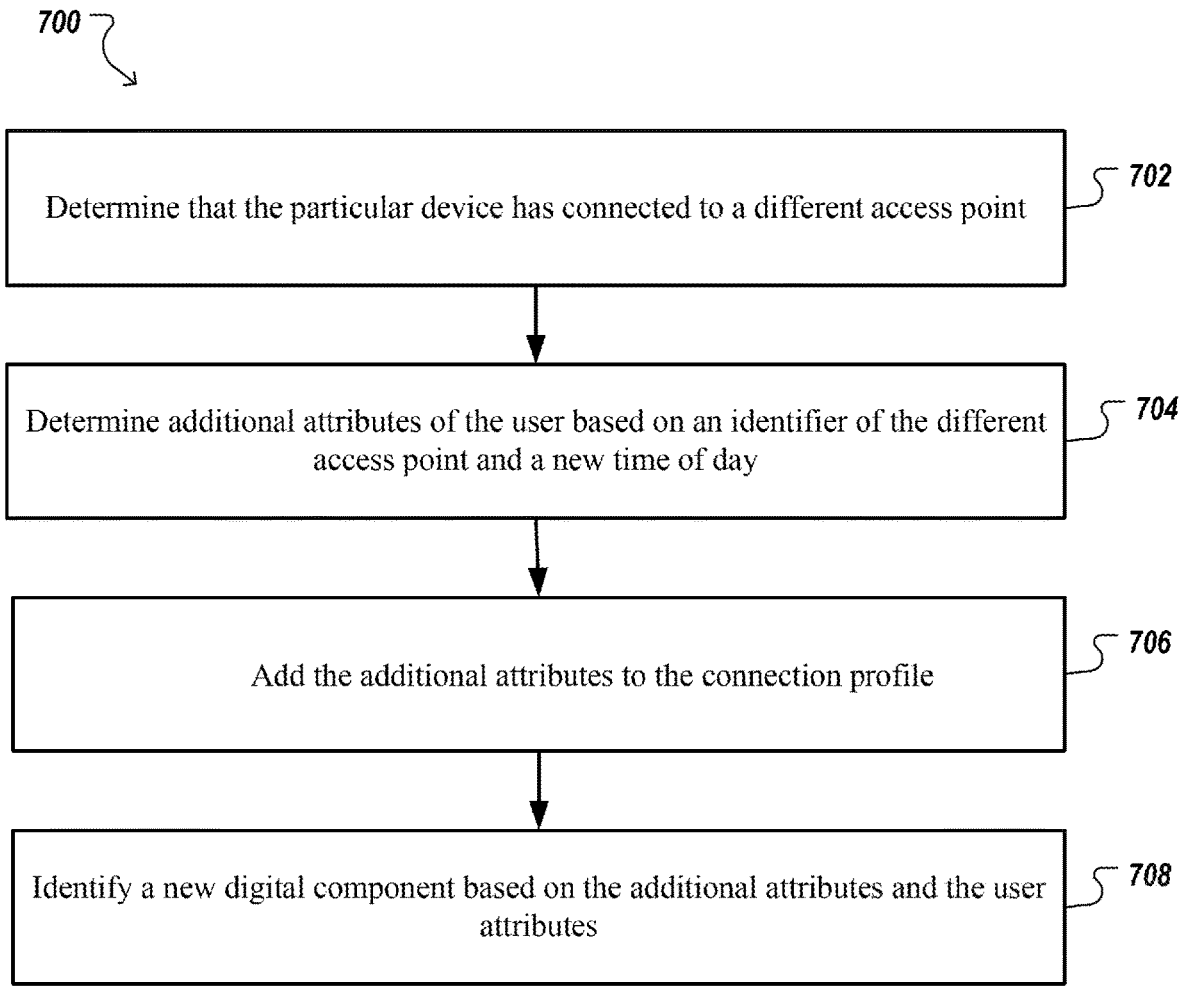
FIG. 7 is a block diagram for identifying that the user device has connected to a new access point and identifying a new digital component based on the updated connection profile.

In some implementations, the experience enhancement system identifies that the user device has connected to a new access point and identifies a new digital component based on the updated connection profile. FIG. 7 is a block diagram for identifying that the user device has connected to a new access point and identifying a new digital component based on the updated connection profile. At 702, the experience enhancement system determines that a particular device has connected to a different access point. The experience enhancement system can make the determination by comparing a device identifier of the connecting device with device identifiers stored in various connection profiles. For example, connection profile 502 of FIG. 5 can have an attribute that stores a device identifier of the connected device. In addition, the experience enhancement system can compare an access point identifier of each connection profile (e.g., AP identifier 506 of FIG. 5) with the access point identifier of the access point (e.g., access point 106) to which the user device is connected. If the device identifier matches a specific connection profile, but the access point identifier does not, the experience enhancement system determines that a particular device has connected to another access point.

At 704, the experience enhancement system determines additional attributes of the user based on an identifier of the different access point and a new time of day. For example, if the access point is located at a specific gate in an airport terminal, the experience enhancement system can request flight information based on the terminal, gate, and time of day. In response, the experience enhancement system receives one or more possible destination for the connection profile. The experience enhancement system can compare the destination data with the location data of the access point to which the user device has connected. If the data matches, the experience enhancement system determines that the user is traveling back to the point of origin. At 706, the experience enhancement system adds the additional attributes to the connection profile. To continue with the example above, the experience enhancement system can store the updated destination as the point of origin related to the destinations already existing in the connection profile.

At 708, the experience enhancement system identifies a new digital component based on the additional attributes and the user attributes. For example, the experience enhancement system can identify a digital component related to both the point of origin and the new destination (e.g., if the new destination is San Francisco and the point of origin is New York, the identified digital component can be an advertisement for a restaurant chain existing in both New York and San Francisco).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few: Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on an electronic device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:
   receiving access point data specifying that a particular user device is connected to a particular access point that is providing Internet access to multiple other different user devices;
   determining, based on the access point data, one or more connection parameters for the connection of the particular user device to the access point, including at least geo-location parameters for the access point;
   transforming, independent of requesting submission of personal information about a user of the particular device and based on the connection parameters for the connection of the particular user device to the particular access point, the connection parameters into attributes of the user, the connection parameters comprising an identifier of the access point and a time of day;
   generating a connection profile for the user based on the attributes of the user and the one or more connection parameters;
   identifying, based on the connection profile generated for the user, a digital component to be presented at the particular user device during the connection of the particular user device to the particular access point; and
   delivering the identified digital component to the user device during the connection of the particular user device to the particular access point, wherein the identified digital component that is delivered to the particular user device during the connection to the particular access point differs from a digital component delivered to at least one of the multiple other different user devices that are also connected to the particular access point.

2. The method of claim 1, further comprising:
comparing the connection profile for the user with connection profiles for other users, wherein each of the connection profiles for the other users is assigned to a connection group of a plurality of connection groups; and
assigning the connection profile to a particular connection group of the plurality of connection groups based on the comparing.

3. The method of claim 1, further comprising:
comparing each of a plurality of connection profiles to other connection profiles in the plurality of connection profiles;
generating, based on the comparing, a first group of connection profiles and a second group of connection profiles, wherein each of the first group of connection profiles and the second group of connection profiles comprises connection profiles with a threshold number of matching attributes;
identifying, for the first group of connection profiles based on matching attributes for the first group, a first digital component to deliver to user devices corresponding to the first group;
identifying, for the second group of connection profiles based on matching attributes for the second group, a second digital component to deliver to user devices corresponding to the second group; and
delivering the first digital component to the user devices corresponding to the first group and the second digital component to the user devices corresponding to the second group.

4. The method of claim 1 further comprising:
determining that the particular device has reconnected to the particular access point;
identifying updated attributes of the user, based on the identifier of the access point and a new time of day;
updating the connection profile based on the updated attributes; and
identifying a new digital component based on differences between the updated connection profile and the connection profile.

5. The method of claim 1 further comprising:
determining that the particular device has connected to a different access point;
determining additional attributes of the user, based on an identifier of the different access point and a new time of day;
adding the additional attributes to the connection profile; and
identifying a new digital component based on the additional attributes and the user attributes.

6. The method of claim 1, wherein transforming the connection parameters into the attributes of the user comprises:
determining based on the identifier of the access point that the access point is located at a travel terminal;
determining, using the time of day, one or more travel routes for the travel terminal; and
generating an attribute of the user based on a destination of the one or more travel routes.

7. The method of claim 1, wherein identifying the digital component comprises:

receiving a plurality of connection profiles and data indicating whether each user corresponding to each of the plurality of connection profiles interacted with a corresponding delivered digital component;
training a neural network by inputting, into the neural network, each of the plurality of connection profiles and the data indicating whether each user corresponding to each of the plurality of connection profiles interacted with a corresponding digital component;
inputting the connection profile into the neural network; and
receiving, as output of the neural network, an identifier of the digital component.

8. A non-transitory computer storage medium encoded with a computer program, the program comprising instructions that when executed by data processing apparatus cause the data processing apparatus to perform operations comprising:
receiving access point data specifying that a particular user device is connected to a particular access point that is providing Internet access to multiple other different user devices;
determining, based on the access point data, one or more connection parameters for the connection of the particular user device to the access point, including at least geo-location parameters for the access point;
transforming, independent of requesting submission of personal information about a user of the particular device and based on the connection parameters for the connection of the particular user device to the particular access point, the connection parameters into attributes of the user, the connection parameters comprising an identifier of the access point and a time of day;
generating a connection profile for the user based on the attributes of the user and the one or more connection parameters;
identifying, based on the connection profile generated for the user, a digital component to be presented at the particular user device during the connection of the particular user device to the particular access point; and
delivering the identified digital component to the user device during the connection of the particular user device to the particular access point, wherein the identified digital component that is delivered to the particular user device during the connection to the particular access point differs from a digital component delivered to at least one of the multiple other different user devices that are also connected to the particular access point.

9. The non-transitory computer storage medium of claim 8, further comprising:
comparing the connection profile for the user with connection profiles for other users, wherein each of the connection profiles for the other users is assigned to a connection group of a plurality of connection groups; and
assigning the connection profile to a particular connection group of the plurality of connection groups based on the comparing.

10. The non-transitory computer storage medium of claim 8, further comprising:
comparing each of a plurality of connection profiles to other connection profiles in the plurality of connection profiles;
generating, based on the comparing, a first group of connection profiles and a second group of connection profiles, wherein each of the first group of connection profiles and the second group of connection profiles comprises connection profiles with a threshold number of matching attributes;

identifying, for the first group of connection profiles based on matching attributes for the first group, a first digital component to deliver to user devices corresponding to the first group;

identifying, for the second group of connection profiles based on matching attributes for the second group, a second digital component to deliver to user devices corresponding to the second group; and delivering the first digital component to the user devices corresponding to the first group and the second digital component to the user devices corresponding to the second group.

11. The non-transitory computer storage medium of claim 8 further comprising:

determining that the particular device has reconnected to the particular access point;

identifying updated attributes of the user, based on the identifier of the access point and a new time of day;

updating the connection profile based on the updated attributes; and identifying a new digital component based on differences between the updated connection profile and the connection profile.

12. The non-transitory computer storage medium of claim 8 further comprising:

determining that the particular device has connected to a different access point;

determining additional attributes of the user, based on an identifier of the different access point and a new time of day;

adding the additional attributes to the connection profile; and identifying a new digital component based on the additional attributes and the user attributes.

13. The non-transitory computer storage medium of claim 8, wherein transforming the connection parameters into the attributes of the user comprises:

determining based on the identifier of the access point that the access point is located at a travel terminal;

determining, using the time of day, one or more travel routes for the travel terminal; and generating an attribute of the user based on a destination of the one or more travel routes.

14. The non-transitory computer storage medium of claim 8, wherein identifying the digital component comprises:

receiving a plurality of connection profiles and data indicating whether each user corresponding to each of the plurality of connection profiles interacted with a corresponding delivered digital component;

training a neural network by inputting, into the neural network, each of the plurality of connection profiles and the data indicating whether each user corresponding to each of the plurality of connection profiles interacted with a corresponding digital component;

inputting the connection profile into the neural network; and receiving, as output of the neural network, an identifier of the digital component.

15. A system comprising:

a digital component server that identifies a digital component to be presented to a particular user device;

a profile server that interacts with the digital component server to perform operations including:

receiving access point data specifying that the particular device is connected to a particular access point that is providing Internet access to multiple other different user devices;

determining, based on the access point data, one or more connection parameters for the connection of the particular user device to the access point, including at least geo-location parameters for the access point:

transforming, independent of requesting submission of personal information about a user of the particular device and based on the connection parameters for the connection of the particular user device to the particular access point, the connection parameters into attributes of the user, the connection parameters comprising an identifier of the access point and a time of day;

generating a connection profile for the user based on the attributes of the user and the one or more connection parameters;

identifying, based on the connection profile generated for the user, a digital component to be presented at the particular user device during the connection of the particular user device to the particular access point; and delivering the identified digital component to the user device during the connection of the particular user device to the particular access point, wherein the identified digital component that is delivered to the particular user device during the connection to the particular access point differs from a digital component delivered to at least one of the multiple other different user devices that are also connected to the particular access point.

16. The system of claim 15, wherein the profile server performs operations further comprising:

comparing the connection profile for the user with connection profiles for other users, wherein each of the connection profiles for the other users is assigned to a connection group of a plurality of connection groups; and assigning the connection profile to a particular connection group of the plurality of connection groups based on the comparing.

17. The system of claim 15, wherein the profile server performs operations further comprising:

comparing each of a plurality of connection profiles to other connection profiles in the plurality of connection profiles;

generating, based on the comparing, a first group of connection profiles and a second group of connection profiles, wherein each of the first group of connection profiles and the second group of connection profiles comprises connection profiles with a threshold number of matching attributes;

identifying, for the first group of connection profiles based on matching attributes for the first group, a first digital component to deliver to user devices corresponding to the first group;

identifying, for the second group of connection profiles based on matching attributes for the second group, a second digital component to deliver to user devices corresponding to the second group; and delivering the first digital component to the user devices corresponding to the first group and the second digital component to the user devices corresponding to the second group.

18. The system of claim 15, wherein the profile server performs operations further comprising:
- determining that the particular device has reconnected to the particular access point;
- identifying updated attributes of the user, based on the identifier of the access point and a new time of day;
- updating the connection profile based on the updated attributes; and
- identifying a new digital component based on differences between the updated connection profile and the connection profile.

19. The system of claim 15, wherein the profile server performs operations further comprising:
- determining that the particular device has connected to a different access point;
- determining additional attributes of the user, based on an identifier of the different access point and a new time of day;
- adding the additional attributes to the connection profile; and
- identifying a new digital component based on the additional attributes and the user attributes.

20. The system of claim 15, wherein transforming the connection parameters into the attributes of the user comprises:
- determining based on the identifier of the access point that the access point is located at a travel terminal;
- determining, using the time of day, one or more travel routes for the travel terminal; and
- generating an attribute of the user based on a destination of the one or more travel routes.

* * * * *